May 8, 1962  J. L. QUINN  3,033,448
AUTOMATIC CHARACTER READING APPARATUS
Filed Oct. 20, 1958  7 Sheets-Sheet 1

INVENTOR
James L. Quinn
By
Carlson, Pitzner, Hubbard & Wolfe
Attys.

May 8, 1962  J. L. QUINN  3,033,448
AUTOMATIC CHARACTER READING APPARATUS
Filed Oct. 20, 1958  7 Sheets-Sheet 2

INVENTOR
James L. Quinn
By
Carlson, Pitzner, Hubbard & Wolfe
Attys

May 8, 1962 J. L. QUINN 3,033,448
AUTOMATIC CHARACTER READING APPARATUS
Filed Oct. 20, 1958 7 Sheets-Sheet 3

INVENTOR
James L. Quinn
By
Carlson, Pitzner, Hubbard & Wolfe

May 8, 1962  J. L. QUINN  3,033,448
AUTOMATIC CHARACTER READING APPARATUS
Filed Oct. 20, 1958  7 Sheets-Sheet 5

INVENTOR
James L. Quinn
By
Carlson, Pitzner, Hubbard & Wolfe
Attys

May 8, 1962 J. L. QUINN 3,033,448
AUTOMATIC CHARACTER READING APPARATUS
Filed Oct. 20, 1958 7 Sheets-Sheet 6

INVENTOR.
James L. Quinn
BY
Carlson, Pitzner, Hubbard & Wolfe
Attys.

United States Patent Office 3,033,448
Patented May 8, 1962

3,033,448
AUTOMATIC CHARACTER READING
APPARATUS
James L. Quinn, Chicago, Ill., assignor to Cummins-Chicago Corp., Chicago, Ill., a corporation of Illinois
Filed Oct. 20, 1958, Ser. No. 768,396
15 Claims. (Cl. 235—61.11)

The present invention relates in general to data processing and in particular to the reading of characters represented by indicia on record mediums such as checks, payment coupons and other business documents.

In recent years there has been a trend toward the "automation" of the bookkeeping and clerical operations in business offices. The demand for time and labor saving equipment, which also largely eliminates human error, has been great. For example, payroll checks and deductions, bills and discounts, and credits to accounts based on receipted bills are all computed, prepared, and totalized by data processors, or "computers." The most inefficient step has been in preparing special punched cards, tapes, or the like which can be "read" to supply the input data to the computer in the form of electrical signals or machine "language." This has involved the visual reading and "typing" of information such as numerical values printed or written on business documents into a card or tape-making machine, a procedure that is time-consuming, costly, and subject to errors by the operator.

Some business documents have been made in the form of "punched cards" so as to be susceptible of direct reading into a computer. This, however, requires that the documents be made of a special, stiff material and that information printed or written in legible form thereon be duplicated by illegible position-coded holes which consume an undue proportion of the document area.

It is the general aim of the invention to bring forth a simplified and more reliable system for automatically reading characters which are represented on business documents or other record mediums by compact indicia, thereby making it possible to create input signals to computers, sorters, tabulators and other machines without an intervening manual or clerical operation.

A related and important object of the invention is to provide improvements and simplifications in the reading of characters represented in legible form by spot indicia, e.g., by conventional perforation patterns.

Still another object is to achieve accurate reading of character indicia from a record medium even though the latter may be continuously traversed at a relatively rapid rate through the reading apparatus.

It is a further object to prevent spurious reading responses when no record medium or document is passing the sensing or reading elements.

An additional object is to make the output of the indicia-reading apparatus substantially independent of the sensitivity or aging of indicia-sensing elements.

Another object is to provide a special output signal at the completion of characters from each separate document, so that the end of each set or "block" of data is indicated to the data processor or other utilization device which receives the signals resulting from the reading operation.

Still another object is to make possible quick and convenient checking and adjusting of the reading apparatus, to ascertain that the principal components are operating properly.

Other objects and advantages will become apparent as the following description proceeds, taken in conjunction with the accompanying drawings, in which.

While the invention has been shown and will be described in some detail with reference to a particular embodiment thereof, there is no intention that it thus be limited to such detail. On the contrary, it is intended here to cover all alterations, modifications and equivalents falling within the spirit and scope of the invention as defined by the appended claims.

Figure 1:
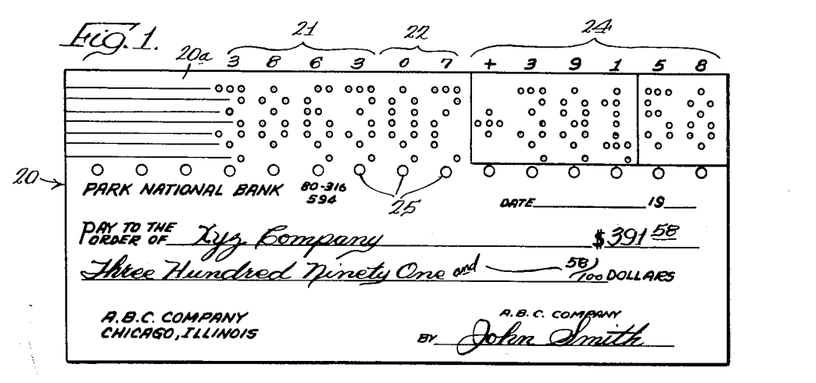
FIGURE 1 is an illustration of a typical business document having numerical characters represented thereon by indicia in the visibly legible form of conventional perforations.

Referring now to FIGURE 1, a typical business document is here illustrated in the form of a check 20 which in its lower portion is conventional in format and written content. Along the upper edge, however, a strip area 20a contains indicia representing characters which are to be automatically read to create signals forming input information to data processing apparatus, sorters or other business machines. In the preferred arrangement here illustrated, the indicia which represents the several characters also makes those characters visibly legible, and more specifically takes the form of spots or perforations applied selectively at different stations within rectangular matrix fields to represent each character.

A first group 21 of characters applied to the area 20a of the check 20 represents the number "3863," which may be the account number for the drawer in the drawee bank; the second group 22 of characters formed by perforations in the area 20a represents the number "07," which may be a transaction code signifying that the amount involved is to be subtracted from the balance of the drawer's account; while the last group 24 of characters made visibly legible by perforations in the area 20a represents "+391.58," indicating the amount of the check. The three groups 21–24 of numerical characters are visibly legible and can be read for checking purposes at a glance. Moreover, they constitute a permanent application of these numerical characters to the paper check, preventing the latter from being altered or raised after it has been written. The account number and the transaction code represented by the character groups 21 and 22 will be the same for all checks of a given drawer, and the perforations therefor may be applied on a conventional perforating machine by punching a whole stack or book of checks at one time. The group of characters 24 which represent the amount of the check can be applied in a check-writing machine at the time that the check is drawn.

Once checks have been drawn with the numerical characters applied thereto by selectively located perforations, it is desirable that the posting and bookkeeping operations required in the drawee bank be carried by automatic data processing apparatus. If the checks can be fed through reading apparatus which will produce electrical signals corresponding to the several numerals represented thereon by perforations, then those electric signals can be fed into the data processing apparatus so that the latter will perform the necessary subtracting, posting and totaling operations. To facilitate such handling of the check 20 by automatic reading apparatus, it is provided with a plurality of feed holes 25 arranged with uniform spacing in a row beneath the area 20a. Each of the feed holes 25 is located with a predetermined spacing relative to one rectangular field occupied by one numerical character. As here shown, each feed hole 25 is disposed directly below the middle one of three vertical lines of perforations which make up the rectangular field containing the perforations for a given character.

Figure 2:
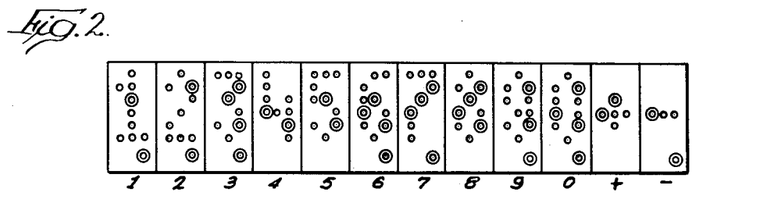
FIG. 2 is a table showing the combinations of perforations which exist at the matrix stations and certain predetermined significant locations within a rectangular perforation field or matrix for each of the characters 0 through 9, +, and —.

The characters visibly represented by patterns of perforations in the check 20 (FIG. 1) are located conventionally within a 3 x 6 rectangular field matrix. As indicated more clearly in FIG. 3, the field area 26 for receiving perforations to represent any one of a plurality of characters is rectangular in shape and has eighteen possible stations (numbered as shown) located at the intersections of three vertical and six horizontal imaginary lines. In addition to the eighteen stations thus formed within a given rectangular field, a nineteenth station is located in the third vertical line (on the right). This latter station is employed for parity checking purpoes, and is here identified by the character "c." By applying perforations selectively at different ones of the nineteen stations (FIG. 3) within a rectangular matrix, any of the numerical characters 0–9, +, or − can be visibly represented. FIG. 2 shows the particular stations which receive perforations in order to represent such numerical characters.

In accordance with one feature of the present invention, indicia-sensing elements are arranged to determine the presence or absence of indicia spots or perforations at certain predetermined significant locations within each rectangular field matrix, and by the unique combination of perforations at those locations to determine the character represented in the rectanguler field. This will be explained in more detail below. It has been discovered, however, that in a 3 x 6 station matrix of the type shown in FIG. 3 and with characters visibly represented by the patterns of perforations shown in FIG. 2, four significant locations exist at stations 6, 8, 10 and 15. These significant locations are represented by circles in FIG. 3. For purposes of parity checking, the auxiliary station "c" is also made a significant location.

Any of the numerical characters 0–9, + or − contains perforations in a unique combination of such significant locations. By identifying the combination of perforations in significant locations, the character itself can be identified. The "code" for this purpose is made clear by FIG. 2. It will be seen that the numeral "1" contains perforations at significant locations "8" and "c," and that none of the other characters of FIG. 2 contain perforations at these, and only these, significant locations. Such significant locations are represented, for clarity, in FIG. 2 by surrounding circles, and it will be understood that such circles are not actually applied to the business documents. In like manner, the character "2" contains perforations at significant locations "6" and "c," and none of the other characters contains perforations at this particular combination of significant locations. The remaining combinations of significant locations which receive perforations as the other characters are applied within a rectangular matrix field will be apparent from inspection of FIG. 2.

Figure 4:
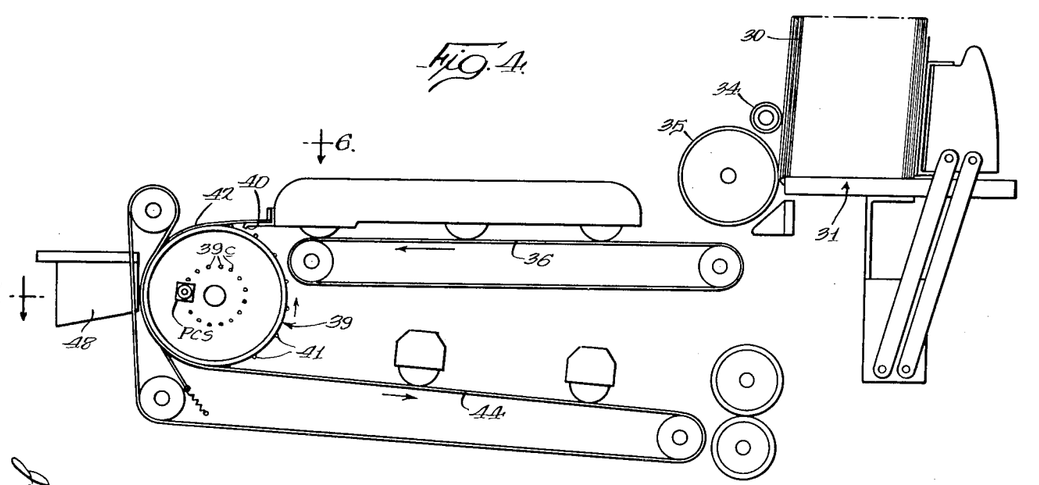
FIG. 4 is a diagrammatic illustration of the mechanical portions of reading apparatus embodying the features of the present invention.

For automatically reading the numerical characters represented by perforations on a number of documents such as the check 20 shown in FIG. 1, a plurality or stack 30 of such checks are placed in the supply hopper 31 of a feeding and alining device of the type diagrammatically illustrated in FIG. 4. These checks are fed one at a time from the magazine by a starting roller 34 and a feed roller 35 onto a continuously moving belt 36 which advances them toward a continuously moving transport here shown as a rotating drum 39 having a plurality of circularly spaced, radially projecting teeth 41. The feed holes 25 (FIG. 1) in each of the individual documents may be automatically alined with and engaged on the teeth 41 by means described and claimed in the copending application of William H. Dreyer, Serial No. 78,773, filed December 27, 1960, a continuation-in-part of the application of William H. Dreyer, Serial No. 768,408, filed October 20, 1958, now abandoned, and assigned to the assignee of the present invention. As each document or check is engaged with the teeth 41 on the drum 39 and carried by the latter through an arc, it is held firmly against the drum surface by means of tensioned, flexible, hold-down straps 32. As the document is advanced to the lower side of the drum 39, it is deposited on a second continuously moving belt 44 and carried to a collecting hopper (not shown). The documents (such as the check 20, FIG. 1) are fed lengthwise to the drum 39 so that the sprocket holes 25 in their left ends are first engaged with the teeth 41.

As each check or document is held in curved conformity to the surface of the drum 39, the indicia or perforation lines thereon travel successively past a reading head 48 which contains a plurality of indicia sensing elements, which here take the form of photosensitive elements of photocells.

The drum 39 is mounted on a shaft 43 journaled in the machine frame (FIG. 6), and has the teeth 41 located near one axial edge, so that the strip or area 20a (FIG. 1) of each document will project beyond the left edge of the drum and pass over an arcuate slot 45 defined between the left end of the drum and a stationary, arcuate guide member 49. The head 48 is stationarily mounted in registry with the slot 45, so that the perforation lines in each document will pass successively thereby. A light source in the form of a lamp 50 is disposed within the space partially enclosed by the drum 39 and the guide 49, so that the perforations in each document pass between the lamp and photoelectric sensing elements carried within the head 48.

Figure 3:
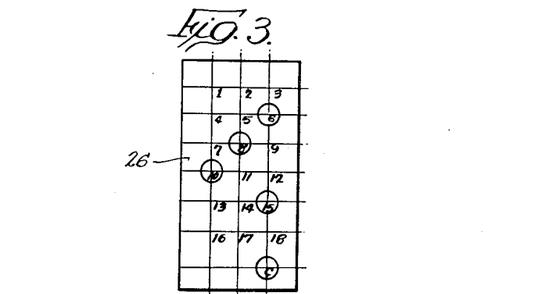
FIG. 3 depicts a rectangular matrix field for receiving perforations to represent in legible form any of the characters of FIG. 2, showing the nineteen possible stations at which perforations may be made, and the five significant locations which are determinative of any given character.
Figure 5:
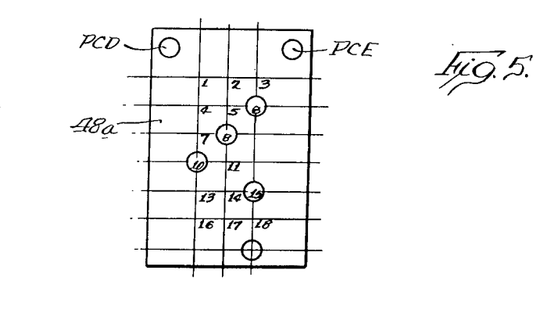
FIG. 5 is a diagrammatic face view of a reading head mounting indicia-sensing elements.

The inner face 48a of the head 48 may be larger in area than one rectangular matrix field in a document which receives the indicia or perforations to represent one character. Yet that face 48a may be considered as having a rectangular matrix field which corresponds to one perforation field (FIG. 5). This inner face 48a is formed with small openings or light-transmitting passages (FIGS. 5 and 6) communicating with the exposed, active ends of five photosensitive elements which are located in a pattern corresponding to the significant perforation locations (FIG. 3). That is, there are exposed photoelectric elements PC6, PC8, PC10, PC15, PCc at significant stations 6, 8, 10, 15 and c. If a rectangular perforation field for any character in a document is placed in registry with the matrix field indicated in FIG. 5 on the face 48a of the head 48, then those particular photosensitive elements disposed at significant locations where perforations exist will receive light from the lamp 50 (FIG. 6) and will be correspondingly activated. The photosensitive elements are bi-state devices since they either receive light or are masked from the light source to be activated or de-activated.

In addition to those photosensitive elements previously noted, the head 48 also mounts a document-sensing photocell PCD and an "end-of-document" photocell PCE. These do not sense the presence or absence of perforations within the record medium, but are simply masked from the lamp 50 whenever a document is passing in front of the reading head.

In order to detect and signal when each perforation field is about to come into full registry with the field of the photosensitive elements, a synchronizing arrangement is employed. As here shown (FIGS. 4 and 6), the drum 39 is formed with a central flange 39b having a circularly disposed array of holes 39c therein. These holes are located on a radius to pass successively in front of a stationary synchronizing photocell PCS, the holes being spaced apart by angles equal to the angle subtended by the width of one character field on a document held against the surface of the drum 39. Since each character field occupies four successive lines (three perforation lines plus a space), and since the feed holes 25 in engaging the teeth 41 properly "phase" each character field relative to the holes 39c, this arrangement results in the photocell PCS momentarily receiving light through one of the holes 39c from the lamp 50 each time that a perforation field is about to be fully alined with the rectangular head field (FIG. 5) in which the photosensitive elements are disposed. Thus, if the status or condition (lighted or unlighted) of the photosensitive elements within the head 48 is determined at instants just after the synchronizing photocell PCS receives light, the combination of perforations in the significant locations of a character field will be sensed or "read" by the combination of photocells which are activated.

Figures 6, 14A, 14D:
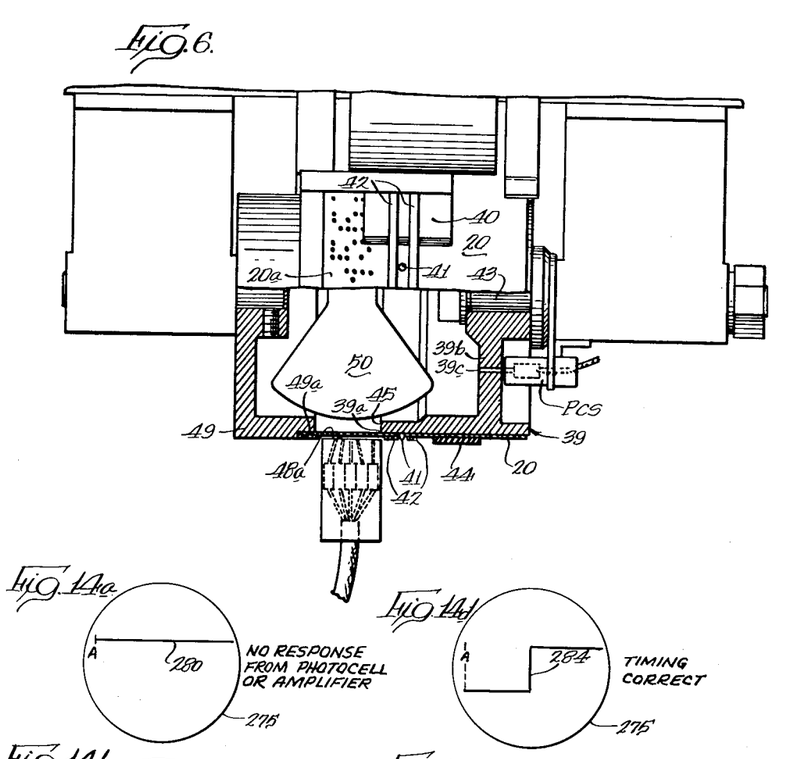
FIG. 6 is a sectional view, taken substantially along the offset line 6—6 in FIG. 4, and showing details of the indicia-sensing arrangement and synchronizing means.
FIGS. 14a through 14e show different patterns obtained on a testing oscilloscope under different conditions.
Figure 7:
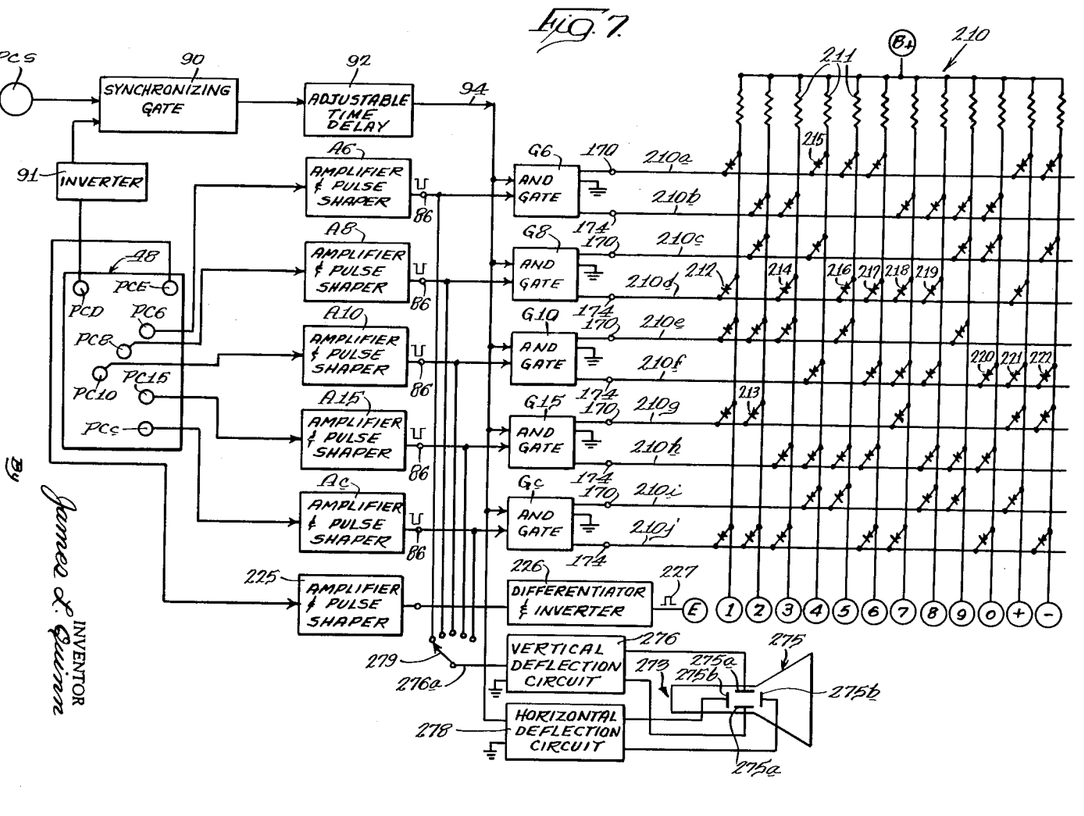
FIG. 7 is a schematic illustration, partially in block-and-line form, of the electrical portions of the reading apparatus.

The intensity of light from the lamp 50, opaqueness of the document material (usually paper), and the sensitivity of the reading photocells may all vary under different conditions or with aging. In order to make certain that the receipt of light by a given photocell always produces a uniform response, the signals from each photocell are amplified and then clipped to exclude marginal responses. As shown in FIG. 7, the five photocells PC6, PC8, PC10, PC15 and PCc are respectively connected to five identical amplifiers and pulse shapers A6, A8, A10, A15, and Ac. Thus, as perforations at different levels within the perforation lines of a document or check 20 pass the respective photocells, the latter will receive light from the lamp 50 (FIG. 6) and will supply a response signal to the corresponding ones of the amplifiers and pulse shapers.

Figure 8:
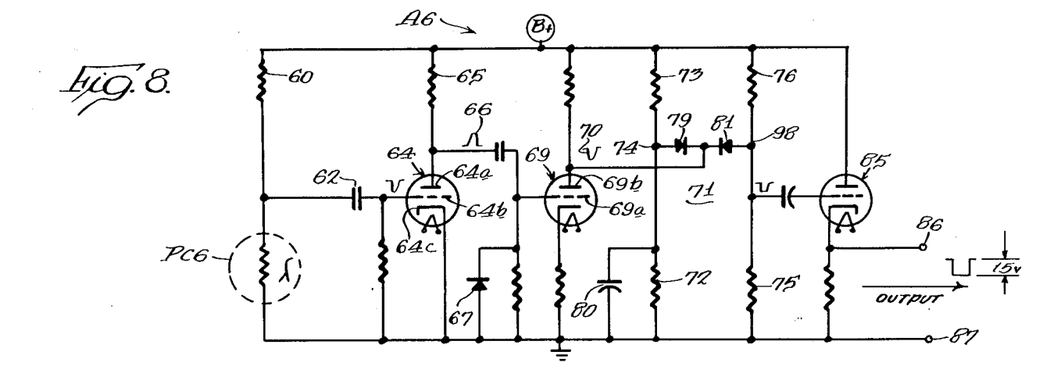
FIG. 8 is a schematic wiring diagram showing the details of one amplifier and pulse shaper.

A typical organization for one of these amplifiers, A6, is illustrated by FIG. 8 wherein the photosensitive element PC6 is of the variable resistance type, comprising material such as lead sulfide, normally having relatively high resistance which decreases when the element is exposed to light. This resistance-varying photocell is connected as part of a potential dividing circuit across a direct voltage source, here illustrated conventionally as having terminals at B+ and ground. The junction between the potential divider formed by the photosensitive element PC6 and a resistor 60 is connected through a coupling capacitor 62 to the control electrode 64b of a first amplifying discharge device or triode 64. The latter has its anode 64a connected through a load resistor 65 to the B+ terminal, and its cathode 64c connected directly to ground.

Each time that light falls momentarily upon the photosensitive element PC6, its resistance will decrease, creating a potential drop at the control electrode 64a so that there will be a positive voltage pulse 66 appearing at the anode 64b. This positive voltage pulse is applied to the control electrode 69a of a second amplifying triode 69. The addition of a diode 67 prevents the control electrode 69a from swinging more negative than ground potential. The response to each positive voltage pulse 66 is a negative-going pulse 70 (of about fifty or more volts in amplitude when the photocell PC6 has optimum sensitivity) at the anode 69b of the triode 69. The output of the triode 69 is supplied to a clipping circuit represented collectively at 71. This includes a potential divider made up of resistors 72, 73 so proportioned that their junction 74 is normally held about 15 volts lower in potential than the steady-state voltage of the anode 69b. It further includes a second potential divider made up of resistors 75 and 76 so proportioned that the junction 78 therebetween is maintained at a potential which is a few volts less positive than the steady-state potential at the anode 69b. As the negative-going pulse 70 builds up, the potential at the junction 78 can only decrease about 15 volts until it equals the potential at junction 74, due to clipping action produced by current flow through a diode 79 and through a relatively large capacitor 80. Moreover, any noise or slight variations in the amplitude of the clipped voltage pulse are not transferred to the junction 78 because of clipping action afforded by a second diode 81. Thus, in response to each momentary light pulse falling on the photosensitive element PC6, a negative-going square wave voltage pulse of about 15 volts amplitude is created at the junction 78. This is amplified by a conventional cathode follower stage 85, and appears between output terminals 86 and 87, the latter being always at ground potential.

Negative-going square wave voltage pulses appear on the output terminals 86 of the amplifiers A6, A8, A10, A15, and Ac shown in FIG. 7 whenever their corresponding input photocells receive light through a perforation hole in a document passing the reading head 48. Even if the strength of the light source, the sensitivity of the photocells, or the amplification of the vacuum tubes should be non-uniform and decrease considerably with age, these output pulses will be of a square wave form and of substantially uniform amplitude, owing to the normally high amplification and clipping described above.

It is desired, however, to sense the conditions of the photosensitive elements only at instants when a document indicia field is in full registry with the field represented by the face 48a (FIG. 5) of the reading head. For this synchronizing action, the photocell PCS is connected to one input of a synchronizing gate 90 (FIG. 7). The other input of that gate is connected through an inverter 91 to the document-presence sensing photocell PCD. Thus, only at those instants when a document is passing by the reading head (and covering the photocell PCD), and when one of the holes 39c (FIG. 4) is in registry with the synchronizing photocell PCS will there be simultaneous input signals to the gate 90 and an output signal produced thereby. This output signal is transferred to an adjustable time delay circuit 92 which may take any one of a variety of forms known to those skilled in the art. After the time delay created by the circuit 92, the response appears on a conductor 94 in the form of a negative-going short voltage pulse.

Figure 10:
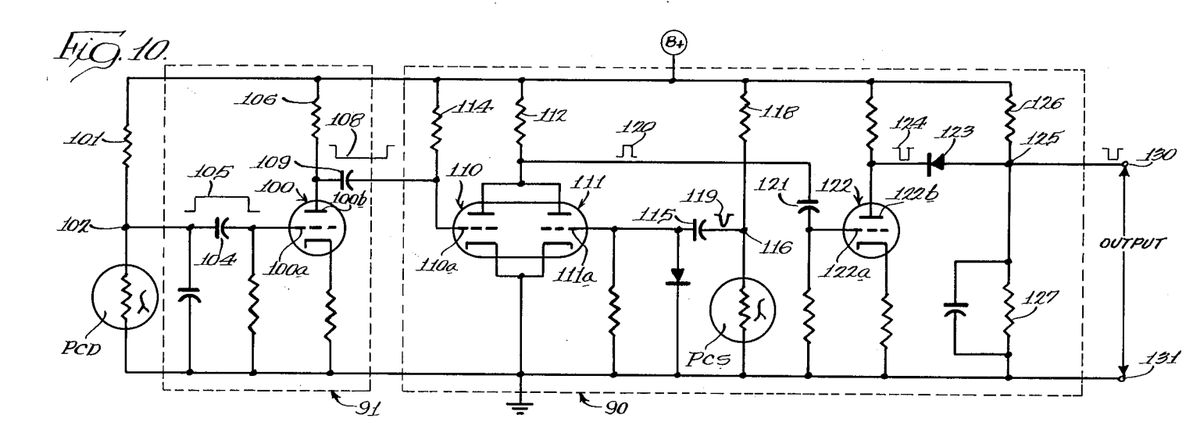
FIG. 10 is a schematic wiring diagram showing exemplary details of an inverter and synchronizing gate.
Figure 11:
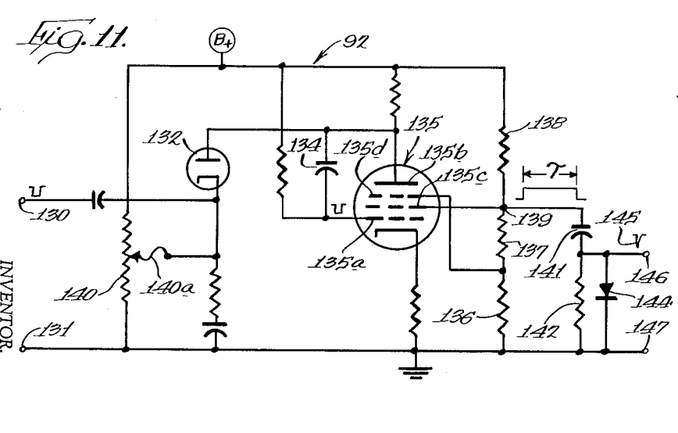
FIG. 11 is a schematic wiring diagram of an exemplary, adjustable time delay circuit.

FIGS. 10 and 11 illustrate preferred, detailed embodiments of the synchronizing gate 90, the inverter 91 and the time delay means 92, although it will be understood that these components may take a variety of forms. As shown in FIG. 10, the inverter 91 consists simply of a single amplifying stage formed by a discharge device or triode 100. The document-sensing photocell PCD is here illustrated as the resistance-varying type connected in series with a resistor 101 to form a voltage divider extending between the terminals of a D.C. voltage source, here conventionally represented as symbol B+ and ground. The junction 102 of this voltage divider is coupled through a capacitor 104 to the control electrode 100a of the triode 100.

When no document masks the photocell PCD, i.e., the latter receives light from the lamp 50 (FIG. 6), the resistance of that photocell is relatively low and the potential applied to the control electrode 100a is relatively low, so that little current flows through the triode 100 and its anode 100b remains at a relatively high positive voltage. However, when a document masks the photocell PCD from the light source, the resistance of that photocell rises abruptly, and the potential of the junction 102 rises abruptly in a square wave represented at 105. The duration of this positive square wave form is equal to the time required for the document to pass completely by the reading head 48. In response to this increased potential at the junction 102, the triode 100 conducts more heavily and creates a larger voltage drop across its plate load resistor 106. Accordingly, a negative-going square wave voltage variation 108 occurs at the anode 100b. This is coupled through a capacitor 109 to one input of the synchronizing gate 90, i.e., to the control electrode 110a of a discharge device or triode 110.

The synchronizing gate 90 (FIG. 10) comprises the first discharge device 110 and a second discharge device 111, the two having their cathodes connected directly to ground and their anodes connected to the B+ terminal through a common load resistor 112. By virtue of a biasing connection 114 from the control electrode 110a to the B+ terminal, the triode 110 normally conducts heavily, but is substantially cut off whenever a document masks the photocell PCD, i.e., whenever the voltage supplied to the control electrode 110a is reduced by a wave form such as that shown in 108. In like manner the control electrode 111a or the triode 111 is normally at a relatively high potential so that the triode normally conducts heavily. This control electrode is coupled through a capacitor 115 to the junction 116 of a voltage divider formed by a resistor 118 connected in series with the synchronizing photocell PCS across the voltage source. When the photocell PCS receives no light, its resistance is relatively high so that the potential at the junction 116 is high and the triode 111 is biased to conduct heavily. However, at those instants when light is passed through one of the holes 39b in the drum 39 to the photocell PCS (FIG. 6), then the resistance of the photocell PCS will be abruptly reduced, and potential at the junction 116 (FIG. 10) will drop abruptly as indicated by the wave form 119. This reduces the potential at the control electrode 111a and results in current flow being substantially reduced through the triode 111.

By virtue of the common load resistor 112, the potential at the common anodes for the triodes 110, 111 will remain relatively low so long as either of those triodes conducts appreciable current. Only if both of the triodes 110 and 111 are simultaneously cut off will the potential at these anodes rise abruptly. In other words, there must be simultaneous masking of the document-sensing photocell PCD and illumination of the synchronizing photocell PCS before the potential at the lower end of the load resistor 112 will rise. When such coincidence occurs, however, potential will rise abruptly to produce a substantially square voltage pulse 120 which is equal in time duration to the wave form 119. Thus, the synchronizing gate 90 will create voltage pulses such as that shown at 120 only if a document is passing by the reading head 48 and at those instants when the synchronizing photocell PCS receives light through one of the holes 39c (FIG. 6).

The output of the triodes 110, 111 is coupled through a capacitor 121 to the control electrode 122a of a conventionally connected amplifying triode 122. In response to each of the positive-going pulses 120, therefore, the voltage appearing at the anode 122b will drop abruptly, as indicated by the wave form 124. This negative-going response of relatively high amplitude (e.g., 50 volts) is transferred through a clipping diode to a junction 125 of a voltage divider formed by two resistors 126, 127 connected across the voltage source. The resistors 126, 127 are so proportioned in value that the junction 125 is normally about 20 volts more negative than the steady-state voltage of the anode 122b. As the anode 122b swings negatively in potential, therefore, the junction 125 will drop about 20 volts in potential, but cannot decrease further due to current flow through the clipping diode 123. The junction 125 is connected to one output terminal 130, the other output terminal 131 being at ground potential. Thus, each time that a document is passing the reading head 48 and the synchronizing photocell PCS receives light, a negative-going pulse will appear between the output terminals 130 and 131.

These two output terminals 130, 131 form the input terminals for the adjustable time delay circuit which is illustrated in detail by FIG. 11. Briefly stated, the receipt of a negative-going voltage pulse on the input terminal 130 results in increased current flow through a diode 132 and the discharge of a capacitor 134 which is connected between the control electrode 135a and the anode 135b of a pentode discharge device 135. The pentode 135 is connected as a phantastron delay generator, having its screen grid 135c and suppressor grid 135d connected to higher and lower potential points on a voltage divider formed by three resistors 136–138. For a detailed understanding of this general type of delay circuit, reference may be had to pages 104–110 of Principles of Radar by Reintjes and Coate, published by McGraw-Hill Book Co., Inc. (New York) in 1952. Essentially, whenever a negative-going voltage pulse is received on the input terminal 130, a positive-going essentially square wave pulse of a time duration $\tau$ is produced at the junction 139 between the resistors 137 and 138. The duration of the time delay $\tau$ is dependent upon the voltage to which the capacitor 134 charges, i.e., upon the steady state voltage of the anode 135b. This voltage may be increased or decreased by setting the wiper 140a of a potentiometer 140 connected across the voltage source. Thus, by adjusting the wiper 140a the time delay or duration $\tau$ of the output pulse appearing at the terminal 139 can be increased or decreased, and with the wiper 140a at a given setting the positive-going square wave voltage response will be produced each time that a negative-going input signal is received on the terminal 130.

In order to signal when the time delay period $\tau$ terminates in each instance, the voltage wave form appearing on the junction 139 is passed through a differentiator made up of a capacitor 141 and a resistor 142 connected in series. The positive-going pulses which result from differentiating the leading edge of the wave form are shunted by a diode 144 connected in parallel with the resistor 142. Accordingly, only negative-going voltage pulses 145 appear between output terminals 146, 147, these output pulses being delayed by an adjustable time interval $\tau$ from the instant that the synchronizing photocell PCS receives light through one of the holes 39c in the drum 39. The output terminal 146 is connected to the conductor 94 (FIG. 7) so that a gating signal, i.e., one of the pulses 145, will appear on that conductor each time that (a) a document is passing in front of the reading head 48 so that the photocell PCD is darkened, and (b) the synchronizing photocell PCS receives light through one of the holes 39c (FIG. 6). The gating signal on the conductor 94 is delayed by a period $\tau$ (which is adjustable according to the setting of the potentiometer wiper 140a, FIG. 11) from the instant that the photocell PCS receives light.

In order to assure that the responses of the reading elements PC6, PC8, PC10, PC15 and PCc are utilized only when a perforation field is in full registry with the reading head field, those responses are blocked until the proper instants by utilization of the gating signals on the conductor 94. Referring to FIG. 7, the conductor 94 leads to control terminals of a plurality of "and" gates G6, G8, G10, G15, and Gc. The output terminals 86 of the amplifiers A6, A8, A10, A15, and Ac are connected to the second input terminals of the gates G6, G8, G10, G15 and Gc, respectively. The gates are "normally closed" until signals appear simultaneously on their control and input terminals.

Figure 9:
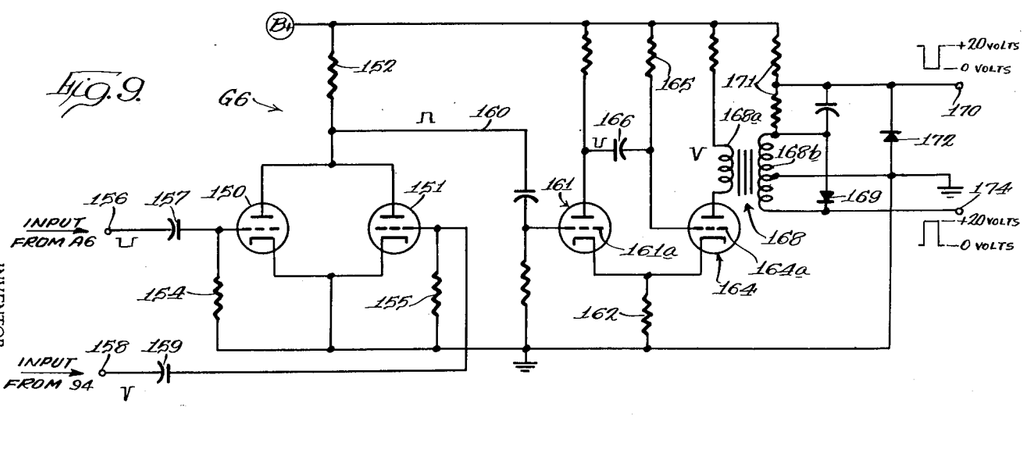
FIG. 9 is a schematic wiring diagram illustrating an exemplary organization for the several "and" gates of FIG. 7.

The details of a typical one of these gates, and here the gate G6, are shown by FIG. 9. Briefly stated, this gate comprises a pair of electron discharge devices or triodes 150, 151 having their anodes connected to a suitable B+ or positive voltage source through a common load resistor 152. Their cathodes are connected directly to ground. Biasing resistors 154 and 155 normally hold the control electrodes of these triodes at ground potential so that both normally conduct heavily. Even if one of the triodes 150, 151 should be driven to current cut-off, the potential at their anodes will not rise appreciably.

A first input terminal 156 (which receives the output of the amplifier A6) is coupled by a capacitor 157 to the control electrode of the triode 150, and a second input terminal 158 (receiving the gating pulses appearing on the conductor 94, FIG. 7) is coupled by a capacitor 159 to the control electrode of the triode 151. If the negative-going pulses on the two input terminals coincide in time, then both the triodes 150 and 151 will be simultaneously rendered non-conductive, and a positive-going voltage pulse will appear on a conductor 160 connected to their anodes.

This positive-going pulse is coupled to the control electrode 161a of a discharge tube 161 normally biased to cut-off by current flow through a cathode resistor 162 connected in circuit with a second triode 164 having its control electrode 164a normally held at a high potential by means of a resistor 165 connected to the B+ terminal. When the positive-going pulse is applied to the control electrode 161a, the triode 161 is rendered conductive. The potential drop at its anode is transferred through a coupling capacitor 166 to the control electrode 164a. This tends to reduce the current flow through the triode 164 by regenerative action, and causes an abrupt decrease in the current flow through the primary winding 168a of a pulse transformer 168 which is connected in series with the anode of the tube 164.

Thus, whenever the "and" circuit G6 responds to simultaneous negative-going signals on the input terminals 156 and 158, a negative-going voltage pulse is induced in the upper half of a center-tapped secondary winding 168b and a positive-going voltage pulse is induced in the lower half of that secondary winding, the center tap being held at ground potential. A diode 169 connected across the secondary winding 168b prevents "ringing" or oscillation following the output pulses. A first output terminal 170 is normally held at a positive potential (on the order of 20 volts) relative to ground by virtue of a voltage divider 171, and is prevented from swinging negative relative to ground by a clamping diode 172. A second output terminal 174 is normally held directly at ground potential, but swings positive relative to ground whenever an output signal occurs. Thus, the two output terminals 171 and 174 are normally at +20 and zero volts, respectively (relative to ground) but swing to potentials on the order of zero volts and +20 volts whenever an output signal is produced by the gate G6.

Referring again to FIG. 7, each of the gates G6, G8, G10, G15 and Gc will provide output signals on their paired output terminals 171, 174 whenever the corresponding photosensitive elements PC6, PC8, PC10, PC15 and PCc receive light through perforations in corresponding significant locations of a coded character field at the instant that a document perforation field is in registry with the reading head, as indicated by the response of the synchronizing photocell PCS and negative-going gating pulses appearing on the conductor 94. If the character "2" is read, then photocells PC8 and PCc will receive light through perforations and the amplifiers A8 and Ac will provide input signals to the gates G8 and Gc simultaneously with the appearance of a gating pulse on the conductor 94. Thus, only the gates G8 and Gc will produce output signals on their terminals 170, 174.

In order to convert the simultaneous responses of different unique combinations of the five gates in single signals corresponding to the different characters, a decoding arrangement is employed. The output terminals of the five gates (FIG. 7) are connected directly to the ten input lines 210a–210j of a decoding diode matrix 210. This matrix includes twelve output conductor terminals, each of which is connected to a suitable positive voltage source here represented conventionally by the symbol B+, through current-limiting resistors 211. Each such output terminal is assigned to one of the characters 0–9, + and −. Each is connected to different combinations of the ten input conductors by unidirectionally conductive devices or diodes. These diodes are poled to conduct current in a direction from each of the output terminals to different ones of the input conductors, and will conduct current when and only when the potential of the associated input line is less negative than the value of the B+ voltage, which may be on the order of 15 volts. The diodes in the matrix 210 are so arranged that current normally flows through all of the resistors 211, creating a voltage drop across each such resistor to hold the output terminal 0–9, +, − at about zero volts potential. Yet, the diodes are so interconnected from the output lines to the input lines that one and only one of the output terminals can rise to a relatively high potential, substantially equal to that of the positive voltage source, when responses of the five controlling gates occur in different combinations.

For example, consider that the numerical character "9" is represented by perforations within a field on a check 20, and such field is registered with the head 48 at the instant a gating pulse occurs on the conductor 94. At that instant there will be a simultaneous response of photocells PC6 and PC15 due to light passing through perforations at significant locations 6 and 15. Under these conditions, the gates G6 and G15 will simultaneously produce changing signals on their output terminals. The matrix input conductors 210a and 210g (normally at +20 volts) will thus be driven to zero volts potential and the input lines 210b and 210h (normally at zero volts) driven to +25 volts potential. Since the remaining gates G8, G10 and Gc provide no response, input lines 210c, 210e and 210i will remain at about +20 volts potential, while input lines 210d, 210f, and 210j will remain at ground potential. Under these circumstances, current flows through the diode 212, thereby creating a potential drop across the associated current-limiting resistor 211, and holding the output terminal "1" near ground potential. Similarly, current flows through diodes 213–222, among others, to hold the output terminals 2–8, 0, + and − near zero or ground potential. Only the output conductor for the character "9" presents no direct current flow path to ground through one of the diodes connected thereto. The output terminl for the character "9" is thus momentarily placed at a relatively high positive voltage, e.g., +15 volts. This high voltage constitutes an output signal representative of the character "9" which has been read from perforation representation of that character on the check.

It will be apparent from the foregoing example and from inspection of FIG. 7 how the diode matrix 210 functions to provide one and only one output signal on a corresponding output terminal for any one of several possible characters represented in a perforation field and read or sensed by the photoelectric head 48.

As the successive fields of successive documents move past the reading head 48, the conditions of the five photocells PC6, PC8, PC10, PC15 and PCc, i.e., whether they are lighted or unlighted, are determined at the instant that each field is in full registry with the field of the head. Accordingly, the gates G6, G8, G10, G15 and Gc respond in successive combinations according to the combinations of perforations in the significant locations of the successive fields. The diode matrix 210 (FIG. 7) thus produces successive signals (momentary increases in potential from about 0 volts to about +15 volts) on individual ones of the output terminals which correspond to the successive characters represented by perforations on the documents.

Such electric signals appearing on the matrix output terminals may be supplied directly, or after recoding, as the input information to data processors or computers, sorters, tabulators, or other office machines, in accordance with well known practices which need not be described in detail. Such office machines are in this manner supplied with input data taken directly and automatically from business documents such as the checks 20, eliminating any need for an intervening human operation of visually reading characters and transcribing them, through the manual operation of typing on a special machine, into a special tape or card record.

Most of the various types of business machines which can utilize the output signals from the matrix 210 will successively store all or part of the numerical data from each check or business document, and will perform the same type of operation on the data from each document. In keeping with one aspect of the invention, a special "end-of-document" or "block" signal is created to indicate when the reading of one document has been completed. This signifies to the office machine that the storing and processing routine is complete for one document and that the next data will come from a succeeding document. This is accomplished as here shown by the end-of-document photocell PCE (FIG. 7) which is disposed within the head 48 outside of the regular reading field. As each document is moved from right to left across the face of the reading head 48 as diagrammatically illustrated in FIG. 7, the photocell PCE will be masked by the leading edge of the document, and then will be uncovered and exposed to the light source as the trailing edge of the document clears the head 48. The photocell PCE is connected in controlling relation to an amplifier and pulse shaper 225 which is organized substantially like the circuit shown in FIG. 8. As the end of each document exposes the photocell PCE to light, the output voltage of the amplifier 225 will drop abruptly, and this voltage drop is converted by a differentiator and inverter circuit 226 into a positive-going pulse 227 fed to an output terminal E. Thus, the terminal E is normally maintained at about zero volts potential but will momentarily rise to a voltage of approximately 15 or 20 volts potential each time that the trailing end of a document passes the reading head. This momentary positive voltage appearing on the terminal E is utilized by office machines of various types to initiate another cycle of operation, i.e., to make it ready to receive input data from the next succeeding document.

Figure 12:
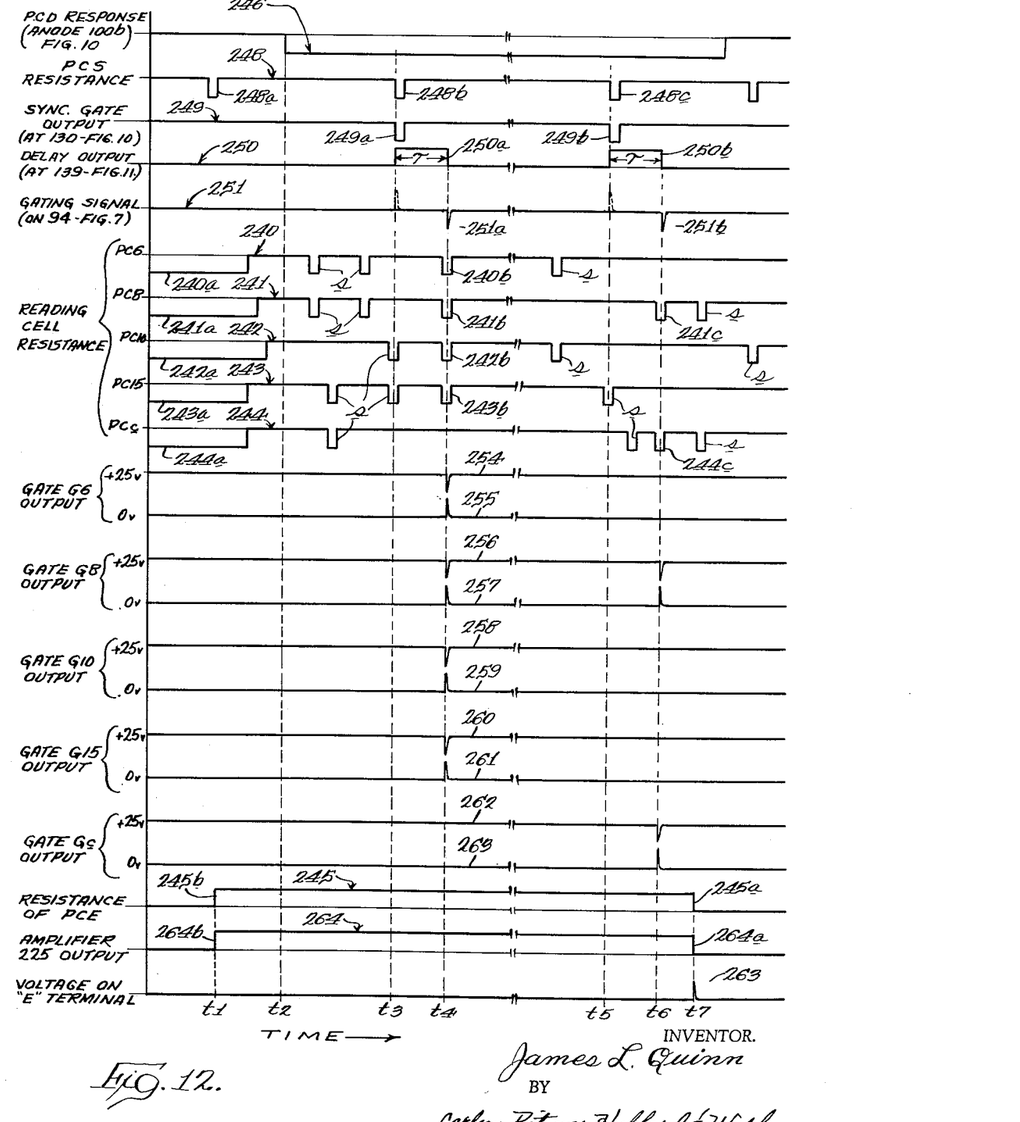
FIG. 12 is a graphic representation showing the timing relations between the several signals which occur in the apparatus of FIGS. 7–11.

The over-all operation of the apparatus and electrical circuits described above may be better understood with reference to FIG. 12, which illustrates the variations of the several different signals or responses with time during the successive reading of two perforated characters from one document. The times scales and pulse widths shown in FIG. 12 are not intended to be precise or to show actual relative durations; on the contrary, the graphical representations of FIG. 12 are intended only to illustrate the general mode of operation of the apparatus.

Let it be assumed that a document is approaching and will pass the reading head from right to left as viewed in FIGS. 5 and 7. Prior to the time instant $t_1$ (FIG. 12), the leading edge of the document has not reached the reading head 48. Accordingly, all of the reading photocells PC6, PC8, PC10, PC15 and PCc will be receiving light from the lamp 50 (FIG. 6). Thus, their relative resistances represented by the graphs 240–244 (FIG. 12) will be low as indicated by the graph portions 240a–244a.

As the leading edge of the document masks the photocell PCE from the light source at the time instant $t_1$ (FIG. 12), the resistance of that photocell increases abruptly as indicated at 245b in the curve 245 which depicts the resistance variation of the cell PCE. Shortly thereafter, the leading edge of the document masks all of the reading photocells and thus causes their resistances to increase abruptly as shown after the time instant $t_1$ by the curves 240–244. Then, at the time instant $t_2$, the leading edge of the document masks the document presence-sensing cell PCD, darkening that cell and causing the inverter 91 (FIG. 10) to produce a reduced voltage at the anode 100b. The curve 246 in FIG. 12 depicts the voltage variation at the anode 100b and indicates that it drops at the time instant $t_2$ when the leading edge of the document masks the photocell PCD.

The variations in the resistance of the synchronizing photocell PCS (FIG. 6) as it periodically receives light through the opening 39c in the rotating drum 39 are represented by the graph 248 in FIG. 12. Each time that one of the holes 39c passes the photocell PCS its resistance will be momentarily decreased, as indicated at 248a, 248b, and 248c. The first such resistance reduction 248a occurs at a time when the output of the inverter 91 (represented by the curve 246) is still high so that no response from the synchronizing gate 90 (FIG. 10) occurs.

The output pulses of the gate 90 are represented by the curve 249 in FIG. 12. After the inverter output 246 drops, then the gate 90 will produce negative-going voltage pulses 249a and 249b at time instants $t_3$ and $t_5$, that is, when the resistance of the synchronizing photocell PCS decreases at 248b and 248a.

The curve 250 in FIG. 12 depicts the output of the phantastron delay circuit (FIG. 11), i.e., the potential variation at the junction 139. As shown in FIG. 12, each time that the gate 90 produces an output pulse 249a or 249b, the delay circuit is triggered into one delay cycle of operation and produces positive-going square wave pulses 250a, 250b which have a time duration $\tau$. After differentiating and clipping, the output of the delay circuit 92 (FIG. 11) has the form shown by the curve 251 in FIG. 12, in which only negative-going pulses 251a and 251b appear. Positive-going pulses occurring at the beginning of the delay circuit response are clipped by the diode 144 (FIG. 11) and thus are shown only in phantom by the curve 251.

The pulses 251a and 251b, therefore, occur at instants $t_4$ and $t_6$ after a delay $\tau$ from the instants $t_3$ and $t_5$ that the synchronizing photocell PCS receives light. By virtue of the mounting position of the photocell PCS and the relationship between the teeth on the drum and the holes 39c in the drum, the photocell PCS receives light before the next perforation field on the document passes into full registry with the field in which the reading photocells are located. Thus, at the instant $t_4$ when the perforation field is exactly alined with the head field, those ones of the reading photocells which receive light will have their resistances momentarily decreased. Assuming that the character "8" is represented in the field, then perforations at significant locations 6, 8, 10 and 15 (see FIGS. 2 and 3) will be opposite the photocells PC6, PC8, PC10 and PC15, thereby producing reduced resistances indicated at 240b, 241b, and 243b (FIG. 12).

Such reductions in the resistance of those four reading photocells will result in negative-going output pulses supplied from the corresponding amplifiers A6, A8, A10, and A15 to the gates G6, G8, G10 and G15. Simultaneously with the arrival of these pulses, the output pulse 251a from the synchronizing gate 92 will appear on the conductor 94, thereby opening these gates. Thus, all of the gates except the gate Gc will produce output responses, that is, their output terminals 170 will be reduced from about 20 volts potential to approximately zero volts potential, while their output terminals 174 will be increased from about zero volts potential to about 20 volts potential. The potential variations on the output terminals of the five gates are depicted by the curves 254–263 in FIG. 12 and show the relative decreases and increases in the potentials of the paired output terminals. When such potential variations applied to the input lines of the matrix 210 (FIG. 7), the potential of the output terminal for the character "8" will increase from substantially zero volts to about 15 volts, signifying that the character "8" has been read. It will be noted that in reading the character "8" no perforation appears at the significant location "c" so that the gate Gc produces no response at its output terminals.

At a later time $t_5$, the resistance of the synchronizing photocell PCS decreases at 248a (FIG. 12), so that the synchronizing gate response 249b will be created and the delay circuit will be caused to produce a second delay response 250b. The negative-going gating pulse 251b results from the differentiation and clipping previously described in connection with FIG. 11, and this pulse 251b appears on the conductor 94 (FIG. 7) as a signal applied to the five gates G6, G8, G10, G15, and Ge. This gating pulse 251b occurs at the time instant $t_6$ which coincides in time with full registration of the next perforation field with the field of the reading head. As this registration occurs, light will be passed through perforations which exist at significant locations within that field. Assuming that the character which is represented by perforations in the field is "1" (see FIGS. 2 and 3), there will be momentary reductions in the resistance of the reading photocells PC8 and PCc as represented at 241c and 244c in FIG. 12. These reduced resistances of the photocells PC8 and PCc result in negative-going output pulses from the associated amplifiers A8 and Ac, and which are supplied to the gates G8 and Gc. Accordingly, changing potentials appear on the output terminals of only the gates G8 and Gc, while the output potentials of the remaining gates G6, G10 and G15 remain unchanged. With this, current flow is cut off through the resistor 211 associated with the output terminal for the character "1" in the diode matrix 210 (FIG. 7) so that the potential of that particular output terminal momentarily rises.

If now at the time instant $t_7$ (FIG. 12), the trailing edge of the document clears the photocell PCE, the resistance of the latter will drop abruptly as shown at 245a, due to the fact that it receives light from the lamp 50 (FIG. 6). Accordingly, the output of the amplifier 225 (FIG. 7) represented by the graph 264 (FIG. 12) will drop abruptly as shown at 264a. After inversion and clipping, this results in an output pulse 263 applied to the terminal E (FIG. 7) which signifies to the utilization apparatus that one complete document has been read. It will be observed that although the resistance of the photocell PCE rose abruptly at 245b (FIG. 7) when that photocell was masked by the leading edge of the document, and that while the output of the amplifier 225 rose abruptly at 264b, no negative-going output pulse was applied to the terminal "E" because of the clipping which occurs in the differentiator and clipper 226 (FIG. 7).

An important concept is clearly revealed by FIG. 12. Although the reading photocells PC6, PC8, PC10, PC15 and PCc all receive light when no document is passing in front of the reading head, no response is produced on any of the output terminals of the diode matrix 210 because the photocell PCD is receiving light and the synchronizing gate 90 is "closed" to prevent gating signals on the conductor 94 (FIG. 7) even though the cell PCS may be receiving light pulses. Also, after a document is passing in front of the reading head so that the presence-detecting photocell PCD is masked from the light source, light will be received at random time instants by the various reading photocells as perforations in different lines of each perforation field pass thereacross. This is shown by the negative-going spurious resistance variations $s$ appearing in the curves 240–244. These resistance variations will result in output responses by the amplifiers A6, A8, A10, Ac associated with the reading photocells and in input signals to the five "and" gates G6, G8, G10, G15, Gc. However, no output responses can appear at the output terminals of these five gates until a gating signal is then being passed over the conductor 94. By virtue of the synchronizing photocell PCS and the time delay circuit 92, this gating signal is made to occur just when the perforation field is fully registered with the reading head field. Thus, spurious responses of the reading photocells are totally rejected and only those which occur when each document field is in proper registry are permitted to pass through the gates and the diode matrix 210 to the output terminals.

Figure 13:
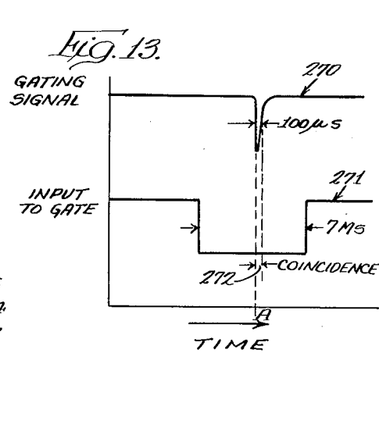
FIG. 13 is a graphic illustration showing the desired timing relationship between a gating signal and an input signal derived from an indicia-sensing element.

FIG. 13 graphically represents at 270 the gating signal which appears on the conductor 94 after a time delay in response to light reaching the synchronizing photocell PCS. The curve 271 (FIG. 13) represents the output signal from one of the amplifiers occurring as a result of light reaching the associated photocell through a perforation in the corresponding significant location of a field as that field is fully registered with the reading head. By way of example, each of these signals (which are supplied to one of the gates) is of approximately 7 milliseconds duration. The time delay $\tau$ provided by the adjustable delay circuit 92 is preferably adjusted such that the gating signal 270 occurs at an instant A, i.e., during the middle portion of the corresponding output signal 271 of the amplifier associated with an activated photocell. The gating signal may be, for example, about 100 microseconds in duration. Thus, there is a short period of coincidence (at 272 in FIG. 13) which is on the order of 100 microseconds in duration. This is the approximate duration of the changes in potential which appear on the output terminals of the corresponding gate (see 254–263, FIG. 12).

In order to assure reliability in the operation of the apparatus, it is desirable that the duration of the delay created by the delay circuit 92 be adjusted such that the coincidence is about that shown in FIG. 13. In order to facilitate such adjustment, i.e., proper setting of the potentiometer wiper 140a in FIG. 11, display means in the form of an oscilloscope are desirably provided. As shown in FIG. 7, the oscilloscope 273 is in itself of conventional organization, having a cathode ray tube 275 with vertical deflection plates 275a connected to a vertical deflection circuit 276, and horizontal deflection plates 275b connected to a synchronizable horizontal deflection sawtooth oscillator 278. The input terminal 276a of vertical deflection circuit 276 is selectively connected through a positionable, multi-contact switch 279 to the output terminal 86 of any one of the amplifiers A6, A8, A10, A15, Ac. The horizontal deflection oscillator 276 receives as synchronizing input pulses the gating pulses which appear on the conductor 94.

With this arrangement, the electron beam within the cathode ray tube 275 will be horizontally swept (from left to right viewing the screen as depicted in FIGS. 14a–e) each time that a gating signal occurs. That is, the short gating signal 270 (FIG. 13) will cause the electron beam to begin at point A (FIG. 14a) on the face of the cathode ray tube and sweep from left to right. Assuming that the switch 279 is connected to the output of the amplifier A6 as shown in FIG. 7, if that amplifier produces no output pulse, then the beam will trace a straight line 280 on the oscilloscope screen (FIG. 14a). If it is known that the perforation field of a document in front of the reading head contains a perforation at significant location "6" so that the photocell PC6 is receiving light, this lack of response shown on the oscilloscope (FIG. 14a) indicates either that the photocell PC6 is defective, or that the amplifier A6 is not operating properly.

Figure 14B:
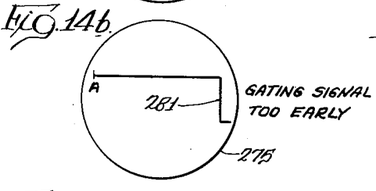

On the other hand, if the trace on the face of the oscilloscope drops abruptly as shown at 281 (FIG. 14b) toward the end of the horizontal sweep period, indicating that the amplifier A6 has produced a negative-going output pulse but which is relatively late, then this indicates that the time delay $\tau$ is too short and the gating signal or point A in FIG. 14b is occurring too early relative to the response of the photocell PC6. This situation can then be corrected by adjusting the potentiometer wiper 140a (FIG. 11) to increase the delay period.

Figure 14C:
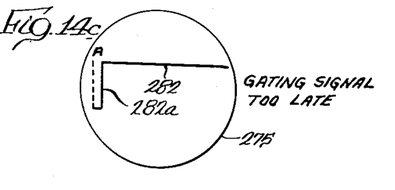

Still further, if the oscilloscope displays a trace pattern such as that indicated at 282 in FIG. 14c wherein the trace begins (time instant A) at a relatively low position and then immediately rises as at 282a, this indicates that the negative output pulse from the amplifier A6 is almost ended by the time the gating signal appears on the conductor 94. Thus, the coincidence is marginal, i.e., the gating signal is occurring too late and the time delay period produced by the delay circuit of FIG. 11 is too long. This situation can also be corrected by resetting the potentiometer 140a to reduce that delay period.

The pattern produced by the electron beam of the oscilloscope as shown at 284 in FIG. 14d indicates that the time delay period is properly adjusted. That is, the abrupt rise in the trace 284 depicts the trailing edge of the response of the amplifier A6, thus indicating that the gating signal occurring at the instant A on the conductor 94 is falling in the midportion of the response of the amplifier A6. This is the proper condition which conforms to the timing relationships illustrated in FIG. 13.

The selector switch 279 may be positioned to selectively connect the output terminals of the five amplifiers A6, A8, A10, A15 and Ac to the vertical deflection circuit 276 so that the response of all amplifiers and their associated photocells may be individually viewed in timed relationship to the gating signals which appear on the terminal 94. Such selective connections through the switch 279 enable an unskilled operator not only to make certain that all of the responses are occurring with proper timing, but to ascertain the operativeness or the strength of each reading photocell and its associated amplifier.

As previously explained in connection with FIG. 8, the photocells themselves provide a relatively small resistance variation as the light is applied to or removed therefrom. The various amplifiers associated with the photocells greatly amplify the small voltage variation produced by this resistance variation, yet clip the amplified voltage in order to make it of a flat-topped, square wave shape. This assures that even though the photocells may age and the sensitivity of the amplifying discharge devices change with age, a uniform output signal from the amplifiers will result. However, if the several reading photocells or the associated amplifiers become so weak that this clipping action does not occur, then the apparatus could produce erroneous responses even though it gave the external appearance of operating properly.

Figure 14E:
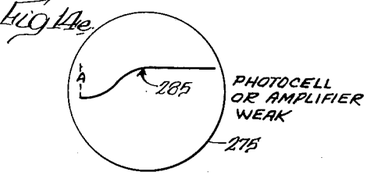

This situation is readily detected by the oscilloscope shown in FIG. 7. If the responses of the different photocells are so weak or the amplification factors of the various tubes so reduced that the clipping action does not occur, then a smoothly varying trace will appear on the oscilloscope screen, as shown at 285 in FIG. 14e. This indicates, even to an unskilled operator, when any of the photocells or tubes within the amplifiers need replacement or maintenance attention. By periodically moving the switch 279 to all of its positions and observing the pattern produced on the screen of the oscilloscope 275, a defective condition can be detected and corrected as soon as it occurs.

I claim as my invention:

1. Apparatus for reading numerical characters legibly represented on business documents by perforations applied in conventional patterns within 3 x 6 eighteen-station rectangular matrix fields, the stations being designatable by the numbers 1 through 18 assigned consecutively from left to right in successively lower rows, said apparatus comprising, in combination, a plurality of sensing elements each having means for producing a response signal when a perforation is alined therewith, said sensing elements being located at stations 6, 8, 10 and 15 within a rectangular matrix field corresponding to a perforation field, means for bringing the perforation fields on the documents into registry with said corresponding field, and means for converting signals produced by different combinations of said elements into a single signal indicative of the particular character represented by the perforations within the registered field.

2. Apparatus for reading characters legibly represented on business documents by perforations applied in different patterns within rectangular matrix fields and with each character having perforations at a unique combination of predetermined significant locations, said apparatus comprising, in combination, a plurality of photosensitive elements relatively disposed at the said significant locations within a rectangular matrix field corresponding to a perforation field, a light source, means for continuously feeding perforation fields of the documents between said source and the corresponding field of said elements, decoding means for converting the illumination of different combinations of said photosensitive elements into signals indicative of characters having perforations in corresponding different combinations of significant locations, normally closed gates interconnecting said photosensitive elements and said decoding means, first means responsive to blocking of light therefrom for detecting the presence of a document between said light source and said corresponding field of documents, second means responsive to light incident thereon for detecting alinement of a perforation field with said corresponding element field, and means for opening said gates only when said first and said second means simultaneously detect the conditions named.

3. Apparatus for reading characters legibly represented on business documents by perforations applied in different patterns within rectangular matrix fields and with each character having perforations at a unique combination of predetermined significant locations, said apparatus comprising, in combination, a plurality of photosensitive elements relatively disposed at the said significant locations within a rectangular matrix field corresponding to a perforation field, a light source, means for continuously feeding perforation fields of the documents between said source and the corresponding field of said elements, decoding means for converting the illumination of different combinations of said photosensitive elements into signals indicative of characters having perforations in corresponding different combinations of significant locations, normally closed gates interconnecting said photosensitive elements and said decoding means, means for generating a signal prior to the instant that each perforation field passes through a position of exact registry with the corresponding element field, an adjustable time delay means connected to receive said signal and operative to produce a gating signal which occurs substantially at said instant, and means to open said gates in response to said gating signal so that spurious responses of said photosensitive elements are eliminated.

4. The combination set forth in claim 3 further characterized by an oscilloscope having vertical and horizontal deflection circuits, means for selectively connecting the signals produced by different ones of said photosensitive elements to said vertical deflection circuit, and means for connecting said gating signals to said horizontal deflection circuit, so that said time delay means may be adjusted by observing said oscilloscope to assure that the gating signals occur when the perforation fields are precisely alined with the field of the photosensitive elements.

5. Apparatus for reading characters legibly represented on business documents by perforations applied in different patterns at a plurality of stations within rectangular matrix fields, said apparatus comprising, in combination, a plurality of photosensitive elements relatively disposed at preselected stations within a rectangular matrix field corresponding to a perforation field, an auxiliary photosensitive element disposed outside of but adjacent to said corresponding field, a light source, means for feeding perforation fields of the documents between said source and the corresponding field of said plurality of elements, means for decoding the combination of said plurality of elements which are illuminated at instants when a perforation field is registered with said corresponding field of elements to produce a signal indicative of the character represented in that perforation field, and means for preventing said decoding means from responding so long as said auxiliary element is not masked from said source by a document passing by said element field.

6. In apparatus for reading characters legibly represented on business documents by perforations applied in different patterns at a plurality of stations within rectangular matrix fields, the combination comprising a plurality of photoelectric elements relatively disposed at preselected stations within a rectangular matrix field corresponding to a perforation field, a light source, means for feeding perforation fields of documents between said source and said corresponding element field, means for amplifying the electric signal produced by each said element when it receives light from said source, means for clipping each amplified signal to a fraction of its value, and means connected to receive the clipped signals for producing an output signal indicative of the character represented by the combination of simultaneously occurring signals, whereby the apparatus is substantially immune to aging and varying sensitivities of said photoelectric elements.

7. Apparatus for reading any of the characters 0–9 represented on business documents by perforations applied at different stations within 3 x 6 rectangular matrix fields, the respective stations being designatable by the numbers 1 through 18 assigned consecutively from left to right in successively lower rows, said apparatus comprising, in combination, four photosensitive elements arranged at stations 6, 8, 10 and 15 within a rectangular field corresponding to a perforation field, a light source, means for continuously feeding the documents between said source and elements to successively bring each perforation field into registry with the element field, means for detecting and signalling the approach of each perforation field into such registry, adjustable delay means responsive to said detecting means for producing gating signals, a diode matrix having ten output terminals corresponding to the characters 0–9 and having four binary inputs, means responsive to said gating signals for supplying one or the other of two signals to each of said binary inputs according to whether the four respective elements are masked from or receive light from said source, said matrix having means for energizing the particular one of the output terminals which corresponds to the perforated character sensed by said photosensitive elements.

8. The combination set forth in claim 7 further characterized by an additional photosensitive element positioned in proximity to the four said elements to be masked by a document passing said element field, and means for preventing the occurrence of said gating signals unless said additional element is masked from said source by a document.

9. Apparatus for reading characters represented on record mediums by indicia spots selectively located at different stations within matrix fields and with each character having indicia spots in a unique combination of significant locations, said apparatus comprising, in combination, a plurality of indicia-sensing bi-state elements arranged at the said significant locations within a field corresponding to an indicia field, means for feeding the record mediums past said sensing elements to bring each indicia field successively into registry with the element field, means for detecting and signalling the approach of each indicia field into such registry, adjustable time delay means responsive to said detecting means for producing a gating signal at the instant of such registration, and means responsive to each gating signal and the then existing states of said elements for producing a single response corresponding to the character represented by the indicia spots in the significant locations of the registered indicia field.

10. Apparatus for reading characters represented on record mediums by spot indicia selectively located at different stations within matrix fields and with each character having indicia spots in a unique combination of significant locations, said apparatus comprising, in combination, a plurality of bi-state indicia-sensing elements arranged at the said significant locations within a field corresponding to an indicia field, means for feeding the record mediums past said sensing elements to bring each indicia field successively into registry with the element field, means associated with each of said elements for producing signals of one or the other of two voltage levels when an indicia spot is or is not opposite that element, means for amplifying and clipping such signals from the respective elements, a diode matrix having one input for each sensing element and one output for each character to be read, means for supplying said amplified and clipped signals to respective ones of said inputs, said matrix including means for supplying a signal to a particular one of said outputs corresponding to the character read as represented by the combination of input signals of one level supplied thereto.

11. Apparatus for reading characters represented on record mediums by spot indicia selectively located at different stations within matrix fields and with each character having indicia spots in a unique combination of significant locations, said apparatus comprising, in combination, a plurality of bi-state indicia-sensing elements arranged at the said significant locations within a field corresponding to an indicia field, means for feeding the record mediums past said sensing elements to bring each indicia field successively into registry with the element field, each of said sensing elements including means for producing one response or the other according to whether an indicia spot is or is not opposite such element, a bi-state presence-sensing element adjacent the edge of said element field which is covered last by a record medium being fed, said presence-sensing element including means for producing one response or the other according to whether a record medium is or is not opposite such element, means effectively connected to said indicia-sensing elements for signalling the particular character represented by the indicia spots opposite and the responses of such elements, and means for preventing operation of said last-named means unless said presence-sensing element is producing said one response.

12. Apparatus for reading characters represented on record mediums by spot indicia selectively located at different stations within matrix fields and with each character having indicia spots in a unique combination of significant locations, said apparatus comprising, in combination, a plurality of indicia-sensing elements arranged at the said significant locations within a field corresponding to an indicia field, a moving transport adapted to engage each record medium and to move the indicia fields thereof successively into registry with the element field, normally inoperative decoding means controlled by said indicia-sensing elements for signalling the particular character represented by the indicia in the significant locations of each field, first synchronizing means triggered by said transport as it brings each indicia field into a registered position, second synchronizing means for detecting the presence of a document fully overlying said element field, and means responsive only to simultaneous operation of said first and second synchronizing means for momentarily rendering said decoding means operative.

13. Apparatus for reading characters represented on record mediums by spot indicia selectively located at different stations within matrix fields and with each character having indicia spots in a unique combination of significant locations, said apparatus comprising, in combination, a plurality of indicia-sensing elements arranged at the said significant locations within a field corresponding to an indicia field, means for continuously feeding the record mediums past said sensing elements to bring each indicia field successively into registry with the element field, means for creating a voltage pulse in response to momentary sensing by each said element of an indicia spot passing thereby, means for detecting and signalling the approach of each indicia field into full registry with the element field, means for producing gating signals after an adjustable time delay from the instant that said detecting and signalling means are actuated, decoding means responsive to simultaneous occurrence of gating signals and voltage pulses from different combinations of said elements for producing output signals indicative of the characters in different indicia fields, an oscilloscope having vertical beam deflection and horizontal sweep circuits, means for selectively applying the voltage pulses created from the responses of said elements to said vertical deflection circuit, and means for supplying said gating signals to said horizontal sweep circuit.

14. Apparatus for reading characters represented on documents by perforations selectively located at different stations within matrix fields and with each character being represented by perforations in a different combination of significant locations, said apparatus comprising, in combination, a plurality of photosensitive elements arranged at the said significant locations within a field corresponding to a matrix field, a light source, means for feeding documents successively between said light source and said corresponding field to bring each matrix field successively into registry with said corresponding element field, normally inoperative decoding means for producing signals corresponding to the characters represented by response of different combinations of said elements to incident light, first and second auxiliary photosensitive elements, means responsive to light incident on said first auxiliary element for signaling the approach of a document field into registry with said corresponding element field, means responsive to blockage of light from said second auxiliary element for signalling that the leading edge of a document has passed completely over said corresponding field, means responsive to simultaneous signalling from said two auxiliary elements for creating a control signal, and means for rendering said decoding means momentarily operative after a predetermined delay from the instant of said control signal.

15. Apparatus for reading characters represented on record mediums by indicia spots selectively located at different stations within matrix fields and with each character having indicia spots in a unique combination of significant locations, said apparatus comprising, in combination, a plurality of indicia-sensing bi-state elements arranged at the said significant locations within a field corresponding to an indicia field, means for feeding the record mediums past said sensing elements to bring each indicia field successively into registry with the element field, means responsive to the existing states of said elements at instants when each indicia field is registered with the element field for producing signals corresponding to the characters represented in the successive indicia field on each medium, an auxiliary bi-state device device disposed just before said element field in a direction in which the record mediums are fed, means causing said auxiliary element to have first or second states when (a) any part of a record medium is opposite it, or (b) no part of a record medium is opposite it, respectively, and means for creating an auxiliary signal in response to changing of said auxiliary element from first to said second state.

References Cited in the file of this patent

UNITED STATES PATENTS

| | | |
|---|---|---|
| 2,000,403 | Maul | May 7, 1935 |
| 2,231,186 | Gould | Feb. 11, 1941 |